(12) United States Patent
Crane et al.

(10) Patent No.: US 11,077,733 B2
(45) Date of Patent: Aug. 3, 2021

(54) DYNAMIC LOAD TRANSFER BY SWITCHABLE AIR VOLUME SUSPENSION

(71) Applicant: Continental Automotive Systems, Inc., Auburn Hills, MI (US)

(72) Inventors: Patrick Alan Crane, Lake Orion, MI (US); Daniel Gregory Goodrich, Cedarville, MI (US); Matthew Conrad Tuhro, Sault Ste. Marie, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 179 days.

(21) Appl. No.: 16/199,329

(22) Filed: Nov. 26, 2018

(65) Prior Publication Data
US 2020/0164710 A1    May 28, 2020

(51) Int. Cl.
*B60G 17/027* (2006.01)
*B60G 5/00* (2006.01)
*B60G 17/052* (2006.01)
*B60G 11/27* (2006.01)
*B60G 17/017* (2006.01)

(52) U.S. Cl.
CPC .......... *B60G 17/027* (2013.01); *B60G 5/00* (2013.01); *B60G 11/27* (2013.01); *B60G 17/0525* (2013.01); *B60G 17/0528* (2013.01); *B60G 17/017* (2013.01); *B60G 2400/51222* (2013.01); *B60G 2400/61* (2013.01); *B60G 2500/201* (2013.01)

(58) Field of Classification Search
CPC ........ B60G 17/027; B60G 5/00; B60G 11/27; B60G 17/0525; B60G 17/0528
See application file for complete search history.

(56) References Cited

U.S. PATENT DOCUMENTS

| 4,826,206 A | 5/1989 | Immega |
| 6,208,920 B1 | 3/2001 | Izawa et al. |

(Continued)

FOREIGN PATENT DOCUMENTS

| DE | 102006011183 A1 | 9/2007 |
| DE | 102006016061 A1 | 10/2007 |

(Continued)

OTHER PUBLICATIONS

International Search Report and Written Opinion dated Feb. 24, 2017 from International Patent Application No. PCT/US2016/064613.

*Primary Examiner* — Faye M Fleming

(57) ABSTRACT

An air suspension system which includes a Dynamic Load Transfer (DLT) function. DLT is a process of transferring vehicle load, or varying normal loads applied to each wheel of the vehicle, using switchable volume or variable volume air spring assemblies. Switchable or variable volume air spring assemblies have the ability to change air spring volumes, which results in changes in air spring rates, which result in changes in normal loads applied to each wheel. Changes in wheel normal loads change wheel traction (slip) and vehicle dynamics (pitch, roll, yaw displacement, rate and acceleration). Each air spring assembly may have multiple volume air chambers that are switched "on" and "off," a variable volume air chamber, or the air spring assembly may be coupled with other air springs, or air chambers, that are switched or varied.

26 Claims, 5 Drawing Sheets

(56) References Cited

U.S. PATENT DOCUMENTS

| | | | |
|---|---|---|---|
| 10,465,763 B2 * | 11/2019 | Bounds | F16F 9/34 |
| 2010/0030425 A1 | 2/2010 | Holbrook et al. | |
| 2011/0231051 A1 | 9/2011 | Gerdin et al. | |
| 2017/0158016 A1 | 6/2017 | Hahn et al. | |
| 2019/0168565 A1 * | 6/2019 | Dolan | B60G 3/20 |
| 2020/0039310 A1 * | 2/2020 | Delorenzis | F16F 9/049 |
| 2020/0094643 A1 * | 3/2020 | Leonard | F16F 9/057 |
| 2020/0122541 A1 * | 4/2020 | Larsson | B60G 17/0164 |
| 2020/0132154 A1 * | 4/2020 | Pniewski | B60G 17/0485 |
| 2020/0207176 A1 * | 7/2020 | Baker | B60G 17/0162 |

FOREIGN PATENT DOCUMENTS

| | | | |
|---|---|---|---|
| EP | 0992373 A2 | 4/2000 | |
| GB | 2518053 A | 3/2015 | |
| WO | 0047432 A1 | 8/2000 | |
| WO | 2007118588 A1 | 10/2007 | |
| WO | 2008054533 A2 | 5/2008 | |
| WO | WO-2016020030 A1 * | 2/2016 | B60G 17/017 |

* cited by examiner

DYNAMIC LOAD TRANSFER BY SWITCHABLE AIR VOLUME SUSPENSION

FIELD OF THE INVENTION

The invention relates generally to an air suspension system which includes air spring assemblies having multiple air volumes, where the air volume of each air spring assembly may be adjusted to change the normal load applied to each wheel, to help control the wheel and/or vehicle dynamic.

BACKGROUND OF THE INVENTION

Suspension systems for vehicles provide vehicle cargo and/or passengers an improved ride. Aft suspension systems utilize air springs, rather than traditional coil springs, and provide different suspension qualities that may be preferable to traditional coil spring suspensions.

A conventional air spring is a device that is arranged between a vehicle body and chassis, such that the air spring applies what is referred to as a "normal load" to a respective wheel. The typical air spring has at least one working space, or cavity, that is filled with compressed aft generated by a compressor. Some air springs have multiple cavities, which may be of different sizes, such that one or more of the cavities may be used as the working space of the air spring assembly. The cavity or cavities filled with compressed air at least partially fills a bellow, and other surrounding areas. There are also air suspension systems in which the air pressure is adjustable such that the ride height of the vehicle and the spring rate of each air spring may be adjusted. Some air suspension systems are used with vehicles having off-road capability. These off-road vehicles often operate under conditions where the suspension jounce is maximized, and the pressure in each air spring increases during compression travel. There are also other instances where a vehicle may be performing various driving maneuvers where undesirable wheel slip or yaw rate may occur. The air pressure in each air spring may be adjusted to change both the ride height and the spring rate to change the normal load applied to each wheel to control wheel and/or vehicle dynamic. However, the change in air pressure to change the normal load typically cannot occur without a change to ride height and at a rate that is acceptable (i.e., is fast enough).

Accordingly, there exists a need for the ability to use multiple cavities in an air spring assembly to alter the normal load applied to a wheel, causing a dynamic load transfer, and providing improvement in control of the wheel and/or vehicle dynamic, without changing ride height and at an acceptable rate, as potential benefits.

SUMMARY OF THE INVENTION

In one embodiment, the present invention is an air suspension system which includes a Dynamic Load Transfer (DLT) function. DLT is a process of transferring vehicle load, or varying normal loads applied to each wheel of the vehicle, using switchable volume or variable volume air spring assemblies. Switchable or variable volume air spring assemblies have the ability to change air spring volumes. These changes in air spring volumes result in changes in air spring rates, which may result in changes in normal loads applied to each wheel. Changes in wheel normal loads change wheel traction (slip) and vehicle dynamics (pitch, roll, yaw displacement, rate and acceleration).

The DLT function of the present invention utilizes different configurations to switch or vary air volumes in the air spring assemblies. In one embodiment, an air spring assembly may have multiple volume air chambers that are switched "on" and "off". In another embodiment, an air spring assembly may have a variable volume air chamber. In yet another embodiment, an air spring assembly may be coupled with other air springs, or air chambers, that are switched or varied.

In one embodiment, the DLT function of the present invention may utilize any driver, vehicle, or other input(s) that may be coupled with logic to determine and predict wheel normal loads and vary them to achieve desired wheel and vehicle behavior by switching and/or varying air spring volumes. In one embodiment, the DLT function and its logic are housed within an Electronic Suspension system module or other module.

Advantages of the DLT function of the present invention include the DLT function of the present invention may be predictive without utilizing consumables. Systems like Dynamic Torque Vectoring, Brake Traction Control, and Anti-Rollover Protection are typically reactive, generate significant noise and utilize consumables, such as brake pads.

In one embodiment, the present invention is a DLT function for an air suspension system of a vehicle, where the vehicle includes an air suspension system having at least one air spring assembly operable for generating a wheel normal load, at least one air volume being part of the air spring assembly, and at least one valve operable for placing one or more of the plurality of cavities in fluid communication with one another.

The current wheel normal load and the desired wheel normal load are determined, and the air volume is configured such that the wheel normal load generated by the air spring assembly is changed to the desired wheel normal load to provide a DLT, configuring the vehicle to have a desired dynamic. The desired dynamic may be at least one wheel dynamic, at least one vehicle dynamic, or a combination thereof.

In one embodiment, the air spring assembly includes a plurality of cavities, such the air volume includes one or more of the cavities, and at least one valve operable for placing one or more of the cavities in fluid communication with one another. The valve is configured such that the wheel normal load generated by the air spring assembly is changed to the desired wheel normal load.

The DLT may be achieved by configuring the valve to provide fluid communication between each of the plurality of cavities. The DLT may also be achieved by configuring the valve to prevent fluid communication between each of the cavities.

In one embodiment, the air spring assembly includes at least one variable volume, and at least one variable volume mechanism operable for controlling the size of the variable volume. The variable volume mechanism configures the variable volume such that the wheel normal load generated by the air spring assembly is changed to the desired wheel normal load.

The wheel normal load may be changed based on one or more of the plurality of inputs, where the inputs may be a combination of one or more driver inputs, one or more vehicle inputs, static road data, or dynamic road data.

In one embodiment, the vehicle includes at least one detection device for generating at least one of the static road data or the dynamic road data, and the vehicle is configured to have the desired vehicle dynamic prior based on at least one of the static road data or the dynamic road data.

In one embodiment, the vehicle is configured to have the desired vehicle dynamic prior to the vehicle performing any specific driving maneuvers which require the desired vehicle dynamic.

In one embodiment, the air suspension systems includes a compressor, and the compressor is used with the valve to control the pressure in the cavities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
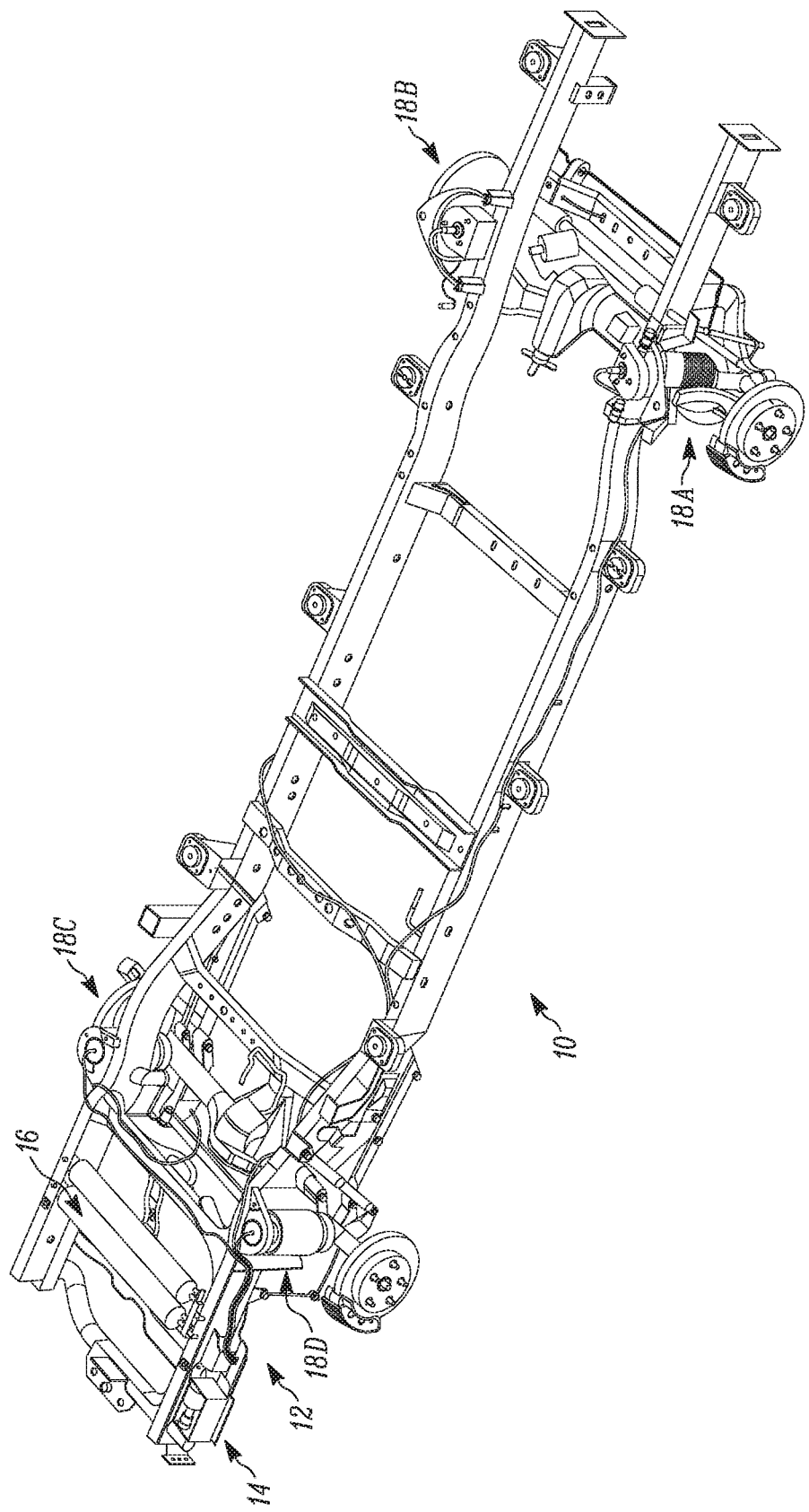
FIG. 1 is a perspective view of various components of a vehicle used with an air suspension system having a dynamic load transfer function, according to embodiments of the present invention.

A chassis of a vehicle having an air suspension system having a dynamic load transfer (DLT) function is shown in FIG. 1 generally at 10. The air suspension system, shown generally at 12, includes an air compressor 14, which is in fluid communication with a reservoir, shown generally at 16, and the air compressor 14 is also in fluid communication with four air spring assemblies 18A-18D. Each of the air spring assemblies 18A-18D is used for absorbing impact during travel of the vehicle. Each air spring assembly 18A-18D may be any suitable air spring assembly having at least one volume which may be variable. In one embodiment, each air spring assembly 18A-18D is a multi-chamber air spring assembly 18A-18D, having different spring rates. In other embodiments, each air spring assembly 18A-18D includes a single air volume, which is variable to achieve different spring rates.

Figure 2:
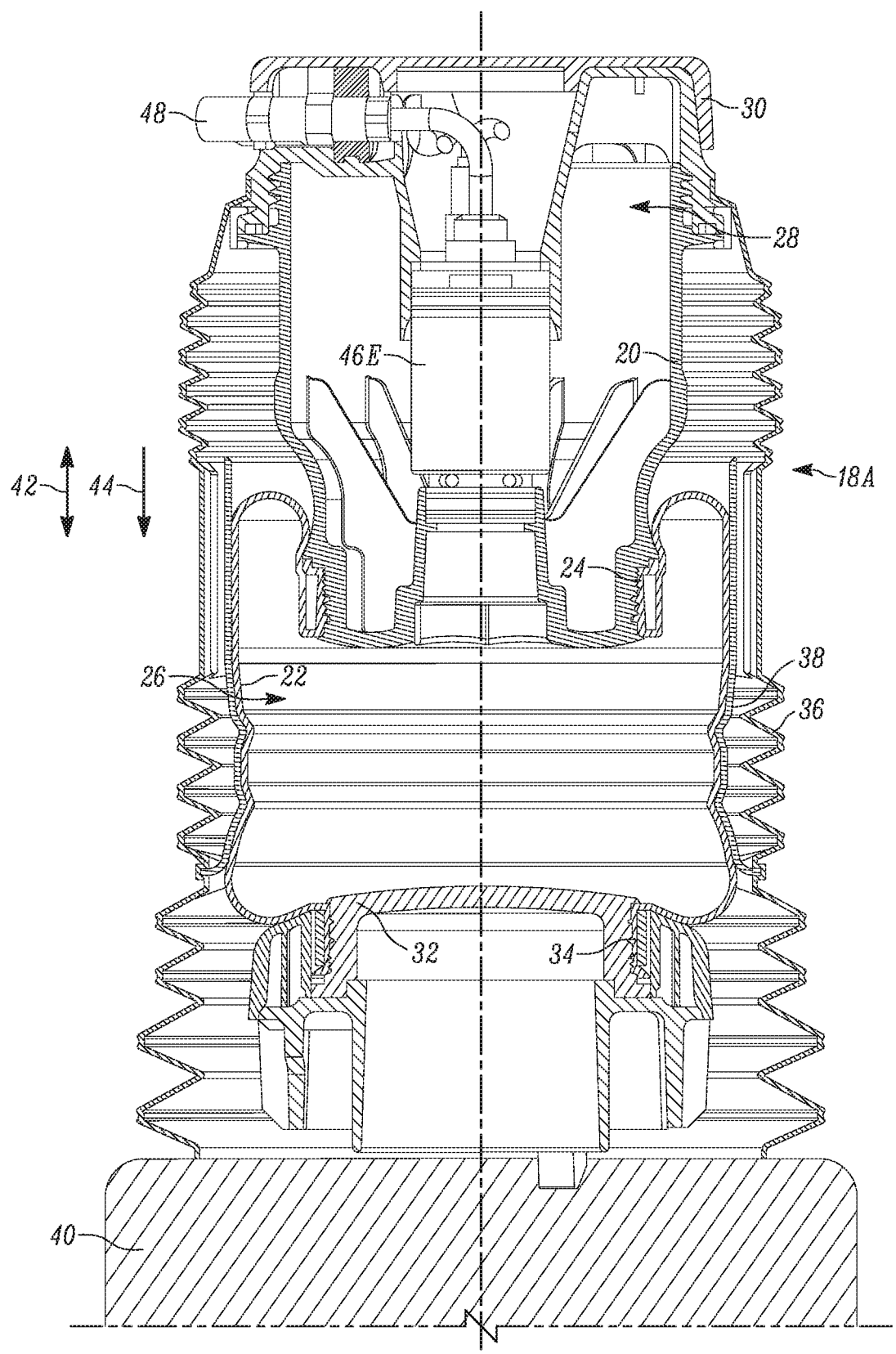
FIG. 2 is a sectional view of an air spring assembly having multiple volumes used as part of an air suspension system having a dynamic load transfer function, according to embodiments of the present invention.

A sectional view of the first air spring assembly 18A is shown in FIG. 2, however, it is within the scope of the invention that the remaining air spring assemblies 18B-18D have similar components. Referring now to FIG. 2, the air spring assembly 18A includes a top cap 20, and a bellow 22, where a first end 24 of the bellow 22 is connected to the top cap 20. The bellow 22 is flexible and able to change shape during vehicle travel. The bellow 22 includes a cavity, shown generally at 26, which is generally filled with air, and is selectively in fluid communication with another cavity, shown generally at 28, formed as part of the top cap 20.

The top cap 20 includes an upper housing portion 30, and the upper housing portion 30 is connected to another component of the vehicle, such as the frame (not shown) of the vehicle, but it is within the scope of the invention that the upper housing portion 30 may be connected to other components of the vehicle as well.

The air spring assembly 18A in this embodiment also includes a lower cap portion 32. Another free end 34 of the bellow 22 is connected to the lower cap portion 32. The cavities 26,28 define two separate volumes of air, where the volume of air in the first cavity 26 may change during vehicle travel, as the lower cap portion 32 moves relative to the top cap 20.

The air spring assembly 18A also includes a gaiter 36, shown in FIG. 2, which is connected to an outer shield 38 and the top cap 20. The outer shield 38 is also connected to the bellow 22. The gaiter 36 provides protection for the air spring assembly 18A against dirt and debris during vehicle travel.

The lower cap portion 32 is connected to another part of the suspension system of the vehicle, such as the vehicle axle 40. As the axle 40 moves from (travel of the vehicle) the lower cap portion 32 moves along a path indicated by the arrow 42, which corresponds to the articulation of the axle 40 relative to the rest of the vehicle, and the volume of the cavity 26 changes during vehicle travel, as the lower cap portion 32 moves in the direction indicated by the path 42. The air spring assembly 18A also applies a force in the direction of arrow 44, which is transferred to the corresponding wheel (not shown). The force applied in the direction indicated by arrow 44 is the "normal load" applied to the wheel by the air spring assembly 18A.

Disposed within the cavity 28 of the top cap 20 is a spring valve 46E, and the spring valve 46E is able to control the flow of air between the cavity 28 of the top cap 20 and the cavity 26 of the bellow 22, such that when the spring valve 46E is in a closed position, the cavity 26 of the bellow 22 acts as a first air volume, and the cavity 28 of the top cap 20 acts as a second air volume, and the cavities 26,28 are isolated from one another. As mentioned above, the air spring assembly 18A shown in FIG. 2 is a multi-chamber air spring assembly 18A, having different spring rates. A stiffer spring rate is achieved by reducing the air volume, which occurs when the spring valve 46E is in a closed position, such that only the air volume in the cavity 26 of the bellow 22 affects the spring rate of the air spring assembly 18A. A lower spring rate is achieved by increasing the air volume, which occurs when the spring valve 46E is in an open position such that the air volume in both the cavity 28 of the top cap 20 and the cavity 26 of the bellow 22 affect the spring rate of the air spring assembly 18A. The spring valve 46E is in fluid communication with a fitting 48, as shown in FIG. 2.

Figure 3:
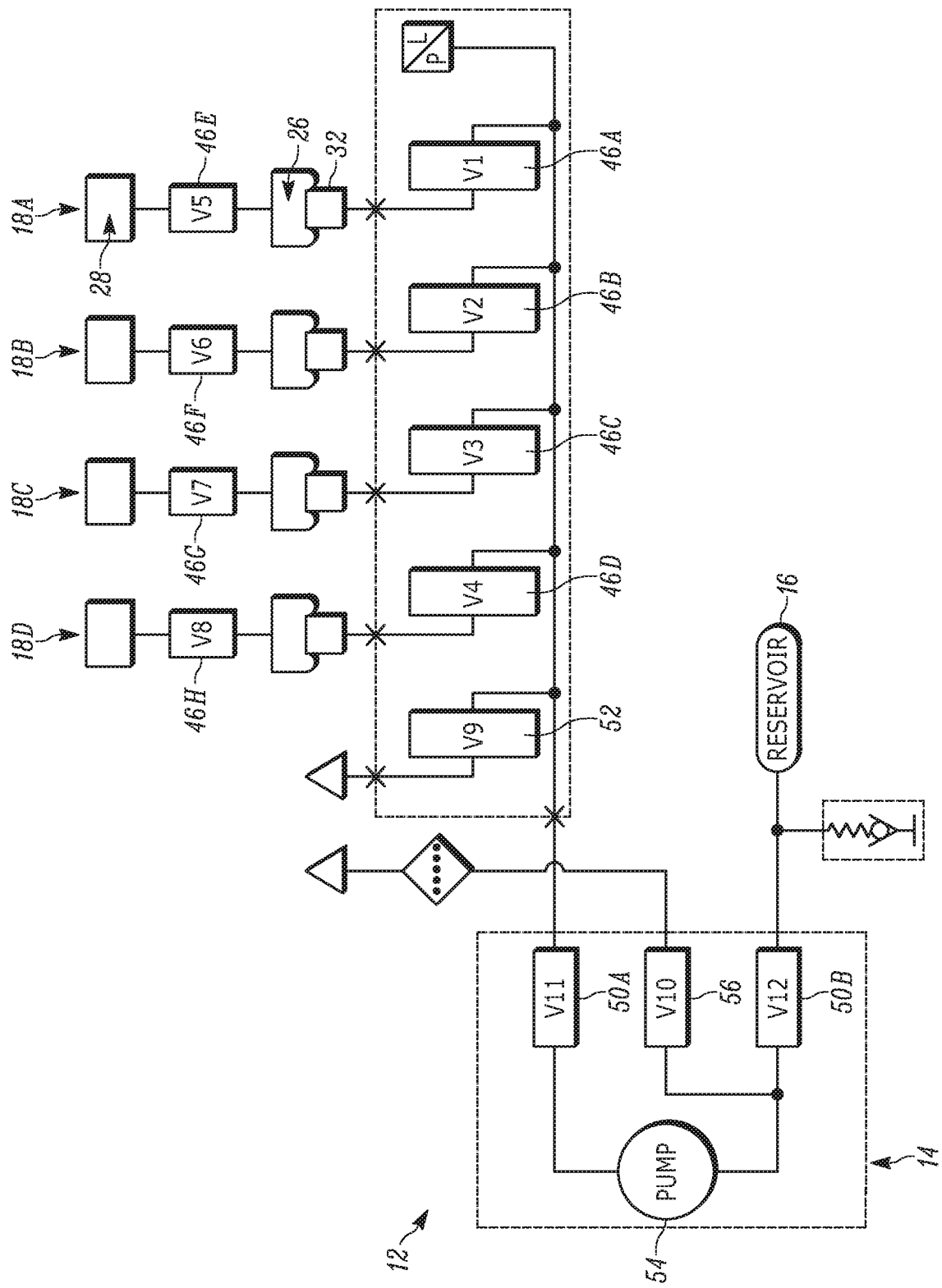
FIG. 3 is a diagram of an air suspension system having a dynamic load transfer function, according to embodiments of the present invention.

Referring now to FIG. 3, a schematic of the air suspension system 12 is shown, including several valves along with the air compressor 14, and the reservoir 16, which are part of the air suspension system 12. The fitting 48 is in fluid communication with one of the valves. More specifically, the fitting 48 (shown in FIG. 2) is in fluid communication with a first valve 46A (shown in FIG. 3), and the first valve 46A is in fluid communication with a first control valve 50A, which is part of the air compressor 14. The first valve 46A allows or prevents air flow into the cavities 26,28. There are additional valves 46B,46C,46D shown in FIG. 3, which control the flow of air into the corresponding air volumes for each of the additional air spring assemblies 18B,18C,18D, where the lower cap portion 32 and air volume of each air spring assembly is shown schematically in FIG. 3. There is also a venting valve 52 in fluid communication with each of the valves 46A,46B,46C,46D,50A and in fluid communication with the atmosphere. Each of the valves 46A,46B,46C,46D is in fluid communication with both the venting valve 52 and the first control valve 50A.

The air compressor 14 also includes a second control valve 50B, the second control valve 50B is in fluid communication with the reservoir 16, and both the control valves 50A,50B are in fluid communication with a pump 54. While is it shown that each of the control valves 50A,50B are part of the air compressor 14, it is within the scope of the invention that each of the control valves 50A,50B may be located in a separate housing, in a separate location from the air compressor 14, while still performing the same function. The air compressor 14 also includes another valve 56, which is in fluid communication with the pump 54, the second control valve 50B, and the atmosphere.

During travel of the vehicle, the air compressor 14 and the valves 46A,46E are used to configure the air pressure in the cavities 26,28, such that the air spring assembly 18A provides the desired ride quality, and the vehicle is traveling at the desired ride height. If the spring valve 46E is in the closed position, the ride quality and ride height is determined by the pressure in the cavity 26 of the bellow 22 only. If the spring valve 46E is in the open position, the ride quality and ride height is determined by the pressure in the combined volume of the cavity 26 of the bellow 22 the cavity 28 of the top cap 20.

Referring now to the schematic in FIG. 3, multiple modes of operation of the air suspension system 12 may be used to change the working volume of air in the first air spring assembly 18A. In one mode of operation, the spring valve 46E is in a closed position, and the first valve 46A, and the control valves 50A,50B are all energized, such that the first valve 46A and the control valves 50A,50B are placed in an open position, and the remaining valves 46B,46C,46D,52,56 are in a closed position. This allows air in the cavity 26 of the bellow 22 to pass through the first valve 46A, through the first control valve 50A, the pump 54, the second control valve 50B, and into the reservoir 16, reducing pressure in the cavity 26 of the bellow 22. Conversely, the second control valve 50B may be placed in a closed position, while the other valves 46A,50A remain in the open position, and the pump 54 is actuated such that air is pumped through the first control valve 50A, through the first valve 46A, and into the cavity 26, increasing pressure in the cavity 26. The valves 46A,50A,50B may be opened or closed and used in combination with the pump 54 at any time during operation of the vehicle when it is desired to increase or decrease the pressure in the cavity 26 of the bellow 22 of the first air spring assembly 18A.

Another example of a different mode of operation of the air suspension system 12 is where the air suspension system 12 is configured to change the working volume of air to reduce pressure in the first air spring assembly 18A. In this mode of operation, the spring valve 46E is again in a closed position, and the first valve 46A and the venting valve 52 are both energized, such that the first valve 46A and the venting valve 52 are both in an open position, and the remaining valves 46B,46C,46D,50A,50B,56 are in a closed position. This allows air in the cavities 26,28 to pass through the first valve 46A, through the venting valve 52, and into the atmosphere. The valves 46A,52 may be opened at any time during operation of the vehicle when it is desired to reduce pressure in the cavity 26 of the bellow 22 of the first air spring assembly 18A.

In yet another mode of operation of the air suspension system 12, the air suspension system 12 is again configured to reduce pressure in the first air spring assembly 18A such that if it is desired to reduce the pressure in the cavity 26 of the bellow 22 of the first air spring assembly 18A, the spring valve 46E, is energized, such that the spring valve 46E is placed in an open position, and the remaining valves 46A, 46B,46C,46D,50A,50B,52,56 are in a closed position. This allows air in the cavity 26 of the bellow 22 to pass into the cavity 28 of the top cap 20, such that the cavity 28 of the top cap 20 and the cavity 26 of the bellow function together as a single working air volume, reducing pressure in the cavity 26 of the bellow 22. The valves 46F,46G,46H may be opened at any time during operation of the vehicle when it is desired to reduce the pressure in the cavity 26 of the bellow 22 of the other air spring assemblies 18B,18C,18D, such that each cavity 28 of the top cap 20 and the cavity 26 of the bellow 22 of each air spring assembly 18B,18C,18D is to function as a single working air volume. Additionally, the spring valve 46E and first valve 46A, as well as the first control valve 50A, may be placed in an open position, and the pump 54 may be activated such that air is pumped through the first control valve 50A, through the first valve 46A, and into the cavity 26, and air also passes through the spring valve 46E and into the cavity 28, increasing pressure in both cavities 26,28.

Furthermore, the pump 54, and the control valves 50A, 50B or the venting valve 52 may be used in combination with any of the valves 46A,46B,46C,46D to control the pressure in the cavities 26,28 of each of the air spring assemblies 18A,18B,18C,18D. Also, more than one of the valves 46A,46B,46C,46D may be opened simultaneously in combination with the control valves 50A,50B or the venting valve 52 to provide pressure relief to one or more of the air spring assemblies 18A,18B,18C,18D. Furthermore, the pump 54 may also be used in in combination with one or more of the valves 46A-46H and the control valve 50A to increase the pressure in the cavities 26,28 of each of the air spring assemblies 18A,18B,18C,18D. In other embodiments, there may be various configurations or arrangements of valves and the pump 54 which are able to control the pressure in the cavities 26,28 of each of the air spring assemblies 18A,18B,18C,18D, such that the air may be transferred to the reservoir 16 or the atmosphere.

The valves 46A-46H,50A,50B,52,56 as described are electromechanical solenoid type valves, which default to a closed position when they are not energized, and change to an open position when energized. However, it is also within the scope of the invention that the valves 46A-46H,50A, 50B,52,56 may also be mechanical valves, such as a check valve, which default to a closed position, and open when a maximum amount of pressure in the cavities 26,28 is reached.

Figure 4:
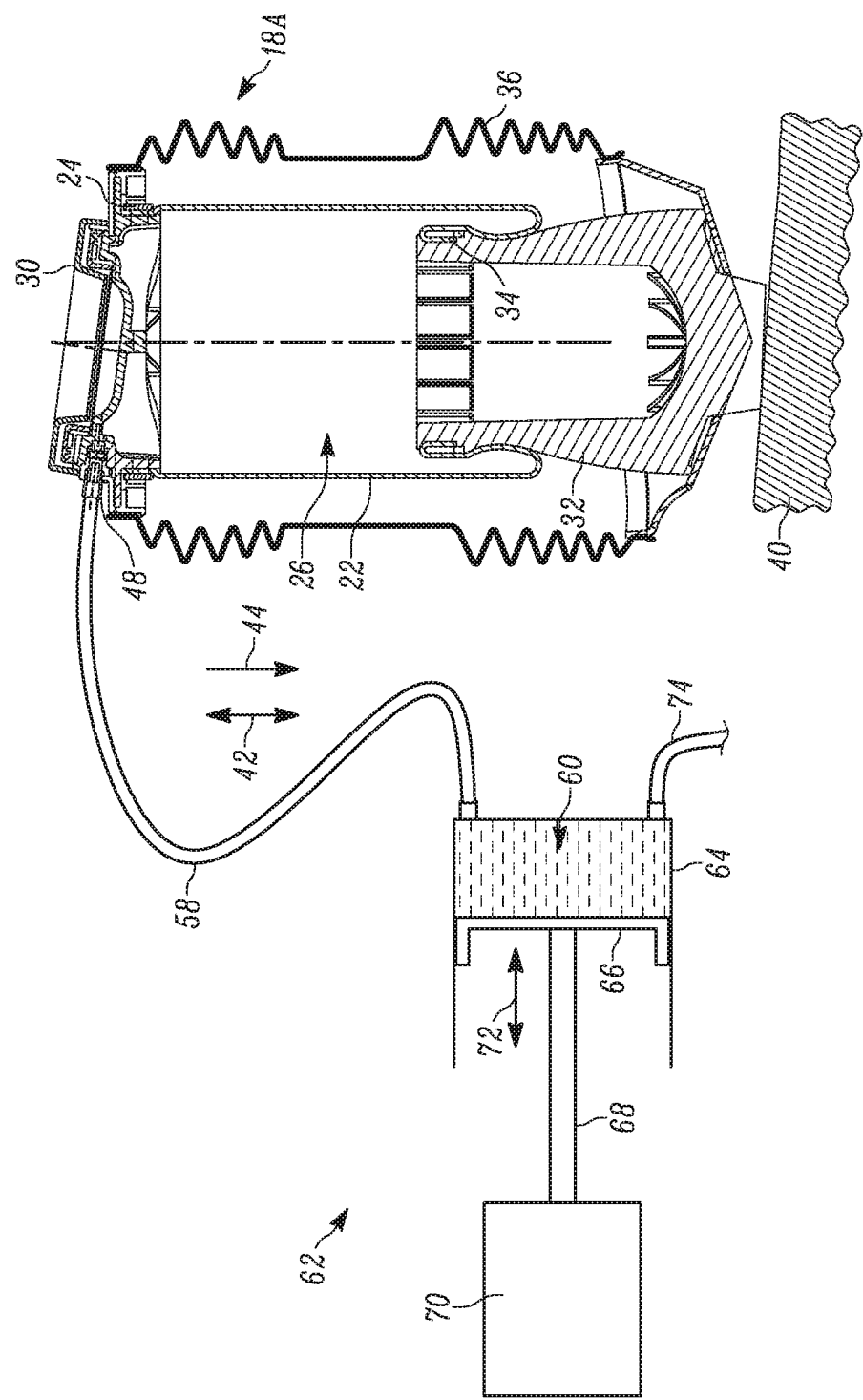
FIG. 4 is a sectional view of a variable volume air spring assembly used as part of an air suspension system having a dynamic load transfer function, according to embodiments of the present invention.

Another example of an air spring assembly is shown in FIG. 4, with like numbers referring to like elements. However, in this embodiment, there is no spring valve 46E, but rather the air spring assembly 18A is a variable volume air spring assembly 18A, and the cavity 26 of the bellow 22 is in fluid communication with the fitting 48. Connected to the fitting 48 is a first conduit 58, and the first conduit 58 is connected to and in fluid communication with a variable volume, shown generally at 60, which is part of a variable volume mechanism, shown generally at 62. The variable volume mechanism 62 includes a cylinder 64, and slidably disposed in the cylinder 64 is a piston 66. The piston 66 is connected to a connecting rod 68, and the connecting rod 68 is connected to an actuator 70. The variable volume 60 is located in the cylinder 64, and the size of the variable volume 60 is changed based on the position of the piston 66 in the cylinder 64. The actuator 70 controls the movement of the connecting rod 68 and the piston 66, such that the connecting rod 68 and piston 66 are able to move along in the directions of the arrows indicated at 72, to change the size of the variable volume 60. Instead of the fitting 48 being in fluid communication with the first valve 46A, in this embodiment, there is also a second conduit 74 which is in fluid communication with the first valve 46A and the variable volume 60.

In this embodiment, the remaining air springs 18B-18D are also variable volume air springs, each having a variable volume in fluid communication with corresponding valves 46B-46D. As with the previous embodiment, the remaining valves 46B-46D, 50A,50B,52,56, the pump 54, and the reservoir 16 function in the same manner.

As mentioned above, a stiffer spring rate is achieved by reducing the air volume, which in this embodiment occurs when the variable volume 60 is reduced. A lower spring rate is achieved by increasing the air volume, which occurs when the variable volume 60 is increased. The actuator 70 is used to change the position of the piston 66, and therefore change the size of the variable volume 60, therefore changing the spring rate of the air spring assembly 18A.

Figure 5:
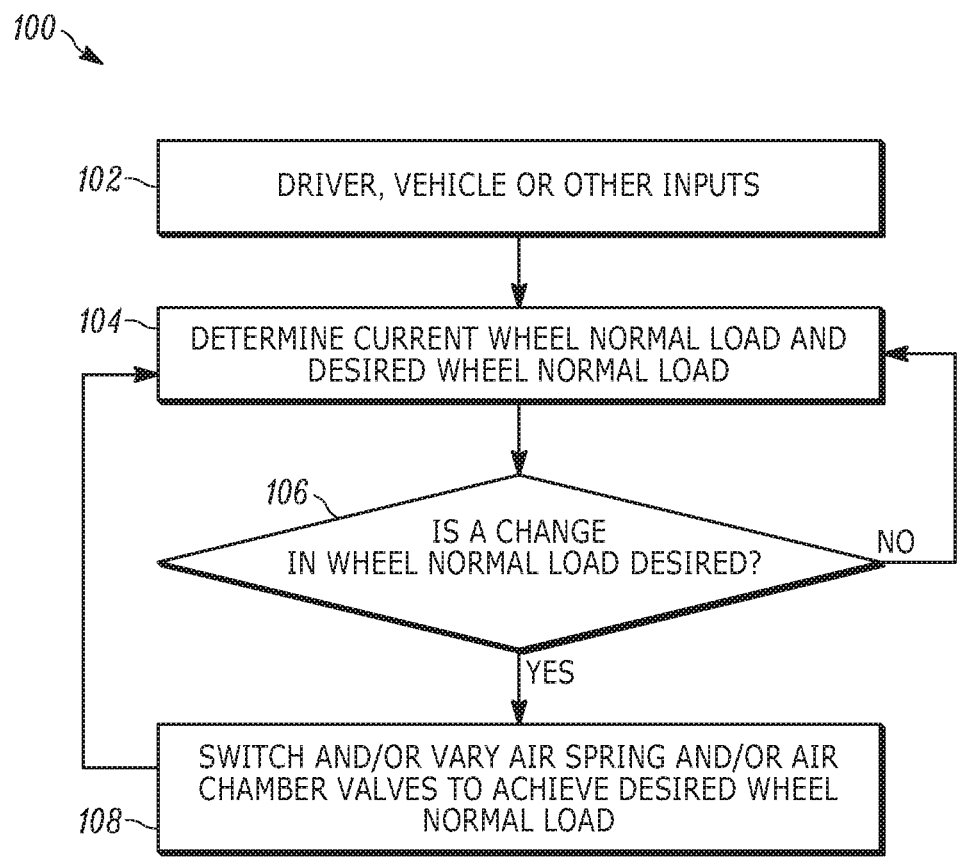
FIG. 5 is a flow diagram of the operation of an air suspension system having a dynamic load transfer function, according to embodiments of the present invention.

A flowchart demonstrating the process by which DLT is achieved is shown in FIG. 5, generally at 100. In step 102, at least one input used, but there may be various inputs, such as driver inputs, vehicle inputs, or other inputs may be used as well. In the first embodiment, driver inputs may be inputs to a control unit to control one or more of the valves 46A-46H,50A-50B,52,56, and in the second embodiment, driver inputs may be input to a control unit to control one or more of the valves 46A-46D,50A-50B,52,56, or the actuator 70. Driver inputs may also be input to a control unit to command the air suspension system 12 to provide a DLT for the vehicle. Vehicle inputs may include, but are not limited to, vehicle speed, vehicle acceleration, lateral acceleration, pitch, roll, yaw displacement and rate. Input may also be from detection devices on the vehicle, such as, but not limited to, LIDAR (Light Imaging, Detection, and Ranging), LADAR (Laser Imaging, Detection, and Ranging), other types of radar, camera, ultrasound, sonar, or global positioning system (GPS).

At step 104, the input from step 102 is used to determine the current wheel normal load, and the desired wheel normal load. The current wheel normal load and the desired wheel normal load are determined by any one or a combination of the inputs mentioned above, and the inputs may be combined with specific logic or calculations. The input may be received by the control unit, which in the first embodiment controls the operation of the compressor 14 and the valves 46A-46H,50A-50B,52,56, and in the second embodiment the control unit controls the valves 46A-46D,50A-50B,52, 56, and the actuator 70. At step 106, a determination is made as to whether a change in wheel normal load is desired. If a change in wheel normal load is not desired, then step 104 is repeated during the travel of the vehicle. If a change in wheel normal load is desired, then at step 108, one or more of the air spring assemblies 18A-18D is reconfigured to achieve the desired wheel normal load. More specifically, the various modes of operation as described in each embodiment above may be used to increase or decrease the amount of total air in each air spring assembly 18A-18D.

More specifically, in the first embodiment the spring valve 46E is configured to allow for one or both of the cavities 26,28 of each air spring assembly 18A-18D to be used as the working air volume to change the spring rate of each air spring assembly 18A-18D. In the first embodiment, the spring rate of each air spring assembly 18A-18D may also be changed by changing the total amount of air (i.e., increased or decreased using the air compressor 14 and reservoir 16) and by changing the working air volume using the spring valve 46E. In the second embodiment, the spring rate of each air spring assembly 18A-18D is changed by changing the variable volume 60 of each air spring assembly 18A-18D. The spring rate of each air spring assembly 18A-18D in the second embodiment may also be changed by changing the variable volume 60 in combination with changing the total amount of air (i.e., increased or decreased) by using the air compressor 14 and reservoir 16.

One or more of the detection devices as described above may be used to provide an indication of one or more types of static and dynamic road data, such as, but not limited to, road profile, speed limits, traffic light data, vehicle traffic data, and vehicle accidents. The air suspension system 12 is then able to achieve a predictive DLT, where the DLT is performed based on the static and dynamic road data such that the vehicle has achieved the desired wheel and/or vehicle dynamic prior to the vehicle performing any specific driving maneuvers which require the desired wheel and/or vehicle dynamic. While it has been described that the air suspension system 12 is able to achieve the predictive DLT, this functionality may be used to achieve a desired wheel dynamic, a desired vehicle dynamic, or a combination of both to achieve the desired DLT.

While it has been described above that each air spring 18A-18D in the first embodiment has two cavities 26,28, it is within the scope of the invention that the air springs 18A-18D may have more than two volumes, and it is also within the scope of the invention that each air spring 18A-18D may include the variable volume 60 in combination with the cavities 26,28 from each embodiment to achieve a desired dynamic load transfer.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
  a dynamic load transfer function for an air suspension system of a vehicle, including:
    an air suspension system, comprising:
      at least one air spring assembly operable for generating a wheel normal load;
      at least one air volume being part of the at least one air spring assembly;
    wherein during travel of the vehicle, the current wheel normal load and the desired wheel normal load are determined, and the at least one air volume is configured such that the wheel normal load generated by the air spring assembly is changed to the desired wheel normal load to provide a desired dynamic load transfer, configuring the vehicle to have a desired dynamic;
    the at least one air spring assembly further comprising:

a plurality of cavities being part of the at least one air spring assembly, the at least one volume including one or more of the plurality of cavities; and at least one valve operable for placing one or more of the plurality of cavities in fluid communication with one another;

wherein the at least one valve is configured such that the wheel normal load generated by the air spring assembly is changed to the desired wheel normal load.

2. The apparatus of claim 1, the desired dynamic further comprising at least one wheel dynamic.

3. The apparatus of claim 1, the desired dynamic further comprising at least one vehicle dynamic.

4. The apparatus of claim 3, wherein the dynamic load transfer is achieved by configuring the at least one valve to provide fluid communication between each of the plurality of cavities.

5. The apparatus of claim 3, wherein the dynamic load transfer is achieved by configuring the at least one valve to prevent fluid communication between each of the plurality of cavities.

6. The apparatus of claim 1, the at least one air spring assembly further comprising:

at least one variable volume, the at least one volume including the at least one variable volume; and at least one variable volume mechanism operable for controlling the size of the variable volume;

wherein the at least one variable volume mechanism configures the at least one variable volume such that the wheel normal load generated by the air spring assembly is changed to the desired wheel normal load.

7. The apparatus of claim 1, further comprising a plurality of inputs, wherein the wheel normal load is changed based on one or more of the plurality of inputs.

8. The apparatus of claim 7, the plurality of inputs further comprising one or more driver inputs.

9. The apparatus of claim 7, the plurality of inputs further comprising one or more vehicle inputs.

10. The apparatus of claim 7, the plurality of inputs further comprising at least one of static road data or dynamic road data.

11. The apparatus of claim 10, further comprising at least one detection device for generating at least one of the static road data or the dynamic road data, wherein the vehicle is configured to have the desired vehicle dynamic based on at least one of the static road data or the dynamic road data.

12. The apparatus of claim 11, wherein the vehicle is configured to have the desired vehicle dynamic prior to the vehicle performing any specific driving maneuvers which require the desired vehicle dynamic.

13. The apparatus of claim 1, further comprising a compressor, wherein the compressor is used with the at least one valve to control the pressure in the plurality of cavities.

14. A method for achieving a dynamic load transfer in an air suspension system for a vehicle comprising the steps of:

providing at least one air spring assembly operable for generating a wheel normal load; and providing at least one volume being part of the at least one air spring assembly;

determining at least one current wheel normal load during travel of the vehicle;

determining at least one desired wheel normal load during travel of the vehicle;

configuring the at least one volume such that the current wheel normal load generated by the at least one air spring assembly is changed to the desired wheel normal load to achieve a dynamic load transfer, configuring the vehicle to have a desired dynamic.

15. The method of claim 14, further comprising the steps of providing the desired dynamic to be at least one wheel dynamic.

16. The method of claim 14, further comprising the steps of providing the desired dynamic to be at least one vehicle dynamic.

17. The method of claim 14, further comprising the steps of:

providing a plurality of cavities being part of the at least one air spring assembly such that the at least one volume includes one or more of the plurality of cavities; and providing at least one valve being part of the air spring assembly, the at least one valve operable for placing one or more of the plurality of cavities in fluid communication with one another;

configuring the at least one valve such that the wheel normal load generated by the at least one air spring assembly is changed to the desired wheel normal load.

18. The method of claim 17, further comprising the steps of configuring the at least one valve to provide fluid communication between each of the plurality of cavities to complete the dynamic load transfer.

19. The method of claim 17, further comprising the steps of configuring the at least one valve to prevent fluid communication between each of the plurality of cavities to complete the dynamic load transfer.

20. The method of claim 14, further comprising the steps of:

providing at least one variable volume, the at least one volume including the at least one variable volume; and providing at least one variable volume mechanism operable for controlling the size of the variable volume;

configuring the at least one variable volume such that the wheel normal load generated by the at least one air spring assembly is changed to the desired wheel normal load.

21. The method of claim 14, further comprising the steps of:

providing a plurality of inputs;

changing the wheel normal load based on one or more of the plurality of inputs.

22. The method of claim 21, further comprising the steps of providing the plurality of inputs to be one or more driver inputs.

23. The method of claim 21, further comprising the steps of providing the plurality of inputs to be one or more vehicle inputs.

24. The method of claim 21, further comprising the steps of:

providing the plurality of inputs to be at least one of static road data or dynamic road data;

providing at least one detection device for generating at least one of the static road data or the dynamic road data;

configuring the vehicle to have the desired vehicle dynamic based on at least one of the static road data or the dynamic road data.

25. The apparatus of claim 24, configuring the vehicle to have the desired vehicle dynamic prior to the vehicle performing any specific driving maneuvers which require the desired vehicle dynamic.

26. The method of claim 17, further comprising the steps of:

providing a compressor;

controlling the pressure in the plurality of cavities with the compressor is and the at least one valve.

* * * * *